Figure 1:
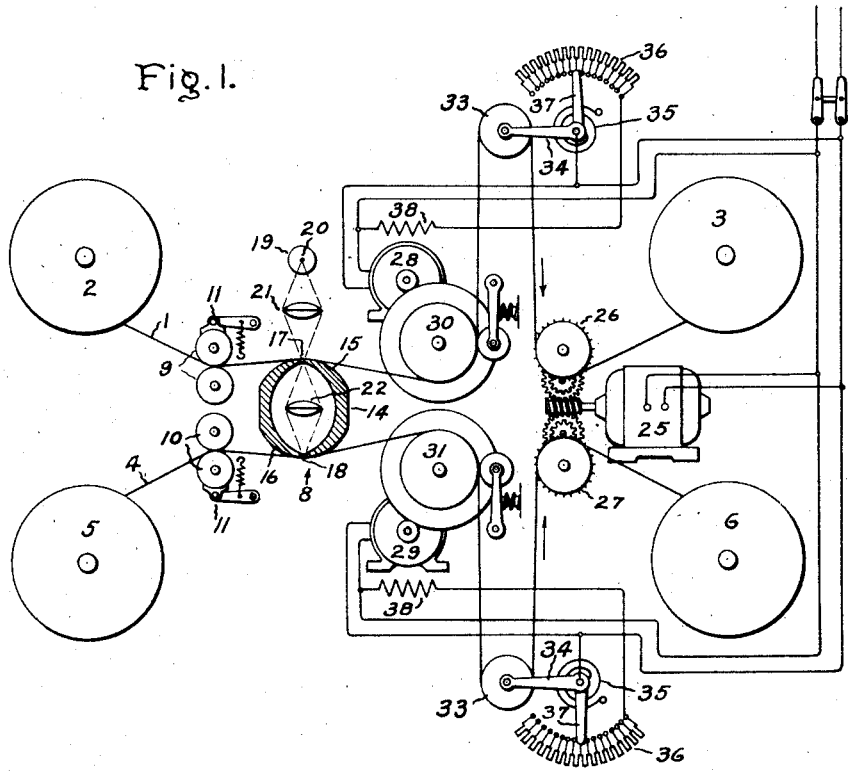

Feb. 3, 1931.   E. W. KELLOGG   1,791,450
FILM PRINTING APPARATUS
Filed Nov. 22, 1927

Inventor
Edward W. Kellogg,
by *His Attorney.*

Patented Feb. 3, 1931

1,791,450

UNITED STATES PATENT OFFICE

EDWARD W. KELLOGG, OF SCHENECTADY, NEW YORK, ASSIGNOR TO GENERAL ELECTRIC COMPANY, A CORPORATION OF NEW YORK

FILM-PRINTING APPARATUS

Application filed November 22, 1927. Serial No. 235,076.

My invention relates to the making of film prints of film sound records.

Where a motion picture record and a film record of the accompanying sounds are made on separate films and the records subsequently printed on a third film, it is necessary for the preservation of the proper synchronism of sound movement in the reproduction to cause the picture and sound records to be printed having at all times the correct relation one with the other. The films are usually driven by means of sprockets engaging suitable sprocket tooth holes formed in the edges of the film. It is found that films as at present constructed undergo a considerable amount of shrinkage incident to development and age so that it is not uncommon for an old film to measure a half pitch less per foot of length than an unused film: By way of illustration, suppose the picture and sound records made on separate films, which during the original exposure were moved by similar sprockets running at equal speeds, are to be printed on a single film. The picture negative may have shrunk a certain amount, the sound negative may have shrunk a greater amount while the unexposed print film may have undergone no perceptible shrinkage. There are then three different lengths of film to be dealt with but all with the same number of sprocket holes. To maintain proper synchronism therefore in the print the movement of the films must be governed by the sprocket tooth openings rather than by the actual lengths of the films.

It is the practice in making prints to draw the negative and the print film past the printing aperture either by engaging the sprocket holes of both films with the teeth of a single sprocket or with two sprockets geared together. A certain allowance for shrinkage of the negative can be made by running the print film outside of the negative film on the same sprocket, thereby in effect using a greater tooth pitch for engagement with the print film than with the negative, the difference being determined by the ratio of the film thickness to the sprocket radius. This system has a fixed allowance for shrinkage and must be designed for average amounts of shrinkage. The degree of shrinkage, however, varies considerably from one film to another and when the sprocket tooth pitch is not exactly equal to the film perforation pitch, the film is jerked into position on the sprocket each time that a tooth engages with a perforation. In the case of a contact print this jerking motion means that one film must slip with respect to the other with consequent blurring of the print. If, in the printing, the area of film being printed at any instant is limited to a strip whose width measured in the direction of motion of the film is of the order of a half wave length or less of the highest frequency sound which is being recorded, this blurring will not occur. By half wave length, in this connection, I mean one half the length of film required to record one complete sound wave. For example, if the film is moving one foot per second and the highest frequency of sound which is regarded as essential is taken to be 6000 cycles or vibrations per second, each cycle of recorded sound would take one six-thousandth of a foot of film or one five-hundredth part of an inch, and a half wave length would be one thousandth part of an inch. One possible method of so limiting the area of film being printed at any instant is to illuminate only a very narrow band while making a contact print, but if the films move at slightly different speeds, holding them in contact will generally result in intermittent slipping. For this reason I prefer to draw the films separately over narrow slits or apertures through which the printing light passes. If this is done, any jerky motion due to sprocket tooth action does not result in blurs but it will result in inequalities of exposure and fluctuations of pitch in the reproduced tones.

An object of my invention is the provision of improved apparatus for making sound film prints in which the above mentioned faults are avoided. Briefly I accomplish this result in the apparatus illustrated by limiting the area being printed at any instant, as described above, and by moving the two films during the printing process by means of smooth rollers or drums whose speeds are free from appreciable fluctuations. If the sound record is to be synchronized with a picture, it is necessary to regulate the speed of both films in terms of number of sprocket holes passed per unit of time. To this end I employ sprockets running at the same speed and each film between its roller and sprocket forms a loop the size of which automatically governs the speed of the roller.

My invention will be better understood from the following description taken in connection with the accompanying drawing, and its scope will be pointed out in the appended claims.

Figure 2:
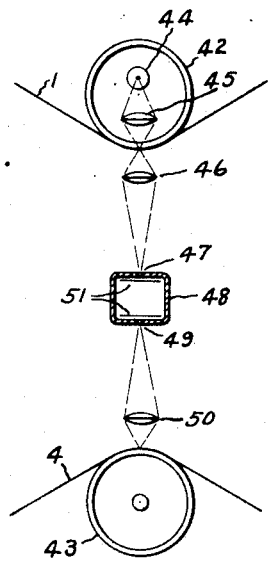
Figure 3:
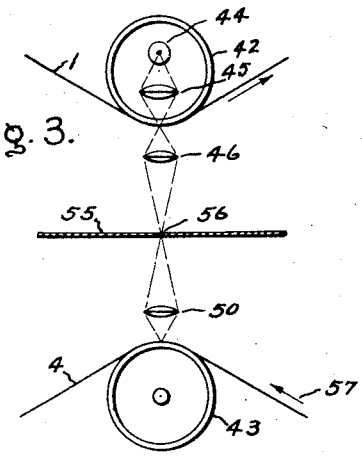

Referring to the drawing, Fig. 1 is a diagrammatic representation of one form of apparatus involving my invention; and Figs. 2 and 3 are fragmentary views illustrating modifications.

In the drawing I have shown at 1 the film having the sound record thereon and from which a print is to be made arranged to be unwound from the reel 2 and wound upon the reel 3. At 4 is the sensitive print film which may or may not have a picture record printed thereon. It is likewise arranged to be unwound from reel 5 and wound upon the reel 6. The unwinding reels may be provided with suitable friction devices to prevent overrunning and the winding reels may be provided with suitable winding devices operatively connected with the driving motor. For the sake of simplicity in the drawing a showing of these devices has been omitted, their use being common in motion picture apparatus.

By means subsequently to be described each film is drawn at a substantially uniform speed over the printer 8, the films being shown as first drawn between pairs of rollers 9 and 10, one roller of each pair having a spring-pressed brake 11 engaging it to give the desired film tension. The printer 8 comprises the casing 14 arranged between the films and having curved faces 15 and 16 forming skids over which the respective films are drawn, the tension of the films together with the slight bend in each film as it passes over its skid sufficing to hold them in proper engagement with the skids. In the two curved portions of the casing 14 constituting the skids, are the narrow light openings 17 and 18 having a width of the order of a half wave length of a high frequency sound through which passes the exposing light from the source 19 having the filament 20. A collecting lens 21 preferably is used to concentrate the light upon the opening 17. The light which passes the opening 17 and that part of the record film covering it at that instant is shown refracted by a second lens 22 to the opening 18 over which passes the print film 4. For better eliminating graininess in the print, the lens 22 is preferably slightly out of focus. Under certain conditions I may even dispense with the lens 22 and rely upon the light reflection from the interior walls of the casing, the walls being covered for this purpose with a light reflecting material. In the latter case at least, the total light which passes through the record film is integrated over the narrow opening covered by the print film. An intense source of light and a relatively slow film movement may be used, the openings being made very narrow so as not to lose the high frequency variations. The record form 1 may, if desired, have the sound record formed thereon on a larger scale laterally than is desired on the print, the consequent contraction of the record during the printing process being of assistance in reducing graininess. The sound record moreover may be made on a larger scale longitudinally, the negative film being accordingly longer than the print film. In making the print in this case the record form will be moved proportionately faster than the print film. This contraction also is of assistance in reducing graininess, as well as in the recording of high frequency sounds, for while it improves only that step in the process in which the negative record is involved, this will almost inevitably improve the over-all result.

For the purpose of producing simultaneous movement of the two films, I have shown an electric motor 25 connected by suitable gearing to the sprockets 26 and 27 engaging the respective films 1 and 4 and two separate electric motors 28 and 29 which through friction wheels drive the drums 30 and 31 over which the respective films 1 and 4 pass. The large friction wheel associated with each drum has a mass such that it acts as a flywheel to smoothen out variations arising in the motor connected therewith and those which may be transmitted through the film from the sprocket. Each film between drum and sprocket is looped around an idler 33 mounted on the arm 34, coil spring 35 serving to take up the slack in the loop of film. Rheostat 36 having adjustable arm 37 is connected to the field winding 38 of each of the motors 28, 29 whereby changes in the size of the loop cause variations in the speed of the associated motor 28, 29. For clarity a rheostate of the ordinary type has been shown. The steps of the rheostat should be very small so as to provide a practically continuous change of resistance and they should also be compact so that only a slight movement is required of the idler engaging the loop. If desired a carbon pile type of rheostat may be used instead of that illustrated. With such a driving mechanism any vibrations set up by the meshing of the sprocket teeth and the sprocket tooth openings in the film are not transmitted to that part of the film which is being drawn over the light aperture. Where the two films are of different length, due for example to the shrinkage of one of them, they must needs be drawn over the respective light apertures at slightly different rates, the shrunken film being moved at the slower speed. The separate driving motors with their regulating mechanisms move the respective driving drums each at the proper speed and independent of the other, the two films being drawn smoothly and independently over the printing apertures and irrespectively of any tooth jerks which the film may receive at the sprocket. The use of direct current motors and field rheostat control is only one of a number of arrangements which I may use by which the lengths of the loops of film can be made to control the speed of their respective drums 30, 31. For example, a very satisfactory means of accomplishing this control is described in the application of Mr. C. L. Heisler, Serial No. 212,349, filed August 11, 1927.

With the above described apparatus the two films may be moved at different speeds without causing blurring, loss of definition or variation in sound pitch in the print. In addition to permitting the negative and print films to run at different speeds the apparatus permits the making of prints having less graininess than is possible with contact prints, for in making a contact print the graininess of the negative is directly reproduced on the print and the latter adds its own graininess, so that the print appears decidedly coarser grained than the negative. In the present apparatus the printing of the individual negative grains on the positive is avoided by avoiding contact or any exact focusing of the negative on the print through lenses. At the same time the necessary detail for the sound record is maintained by the use of the narrow slits, each elementary area of the print film, or that part of it which at a given instant is opposite its aperture lying exposed to the diffused light whose intensity is controlled by the average opacity of the corresponding elementary area of the negative. There is therefore not a strict point by point correspondence between negative and print such as is produced in a contact print, but only a correspondence between density of print and transmission of light through the negative as averaged over the entire slit area.

In the modification illustrated by Fig. 2 I have shown an arrangement for insuring diffusion of the light before it reaches the print film, while at the same time conserving the light so far as is compatible with diffusion. In this modified form of apparatus the films 1 and 4 are passed over members 42 and 43 which may be skids or drums. The member 42, if it is a rotating drum, may be constructed of transparent material or may be provided with a suitable light opening or if desired that part of the film bearing the sound record may overhang the edge. Light from source 44 is concentrated on the sound record on the film 1 by lens 45 and after passing through it is focused by lens 46 on the aperture 47 in one side of the diffusing box 48. From the aperture 49 in the other side of the box the light is focused by the lens 50 on the film 4 supported by the member 43, the apertures at the films in this case being optical rather than physical. The diffusing box 48 is shown having a diffusing screen 51 in front of each aperture and preferably has its inner surface covered with some light reflecting material. Since with this arrangement also the total light passing through the original record is integrated over the illuminated area of the print film it prevents the printing of any grained structure which existed in the original record.

In the modified form shown in Fig. 3 the arrangement is the same as in Fig. 2 except that I use simply a screen 55 between the films, having an aperture 56 through which passes the light from lens 46 to lens 50. Where the image is sharply focused in the print film as in this form of my invention, printing of the individual grains of the record film may be avoided by causing the print film to move in the direction opposite to that in which the image moves or in the direction indicated by arrow 57 in Fig. 3. This arrangement is equivalent in its operation to that shown in Fig. 1 but has the advantage that it does not involve sliding the film over anything which might scratch it. In the arrangement shown in Fig. 3 the diameters of the lenses 46 and 50 must be large compared with the length of the aperture 56, or else a lens should be placed close to the aperture in order to direct all the light issuing from the aperture into the focusing lens 50.

The arrangements shown in Fig. 1 and Fig. 3 are suitable for printing either sound records of the variable width or variable density type, whereas the arrangement of Fig. 2 would give a variable density print whichever type of negative was used. When making prints of the variable width type with the optical system of Fig. 1 it is permissible to use lens 22 sufficiently out of focus to reduce graininess, since such sound records do not require an extremely sharp line of demarkation between the exposed and unexposed portions. A similar result may be secured by means of a modification of Fig. 2 in which the diffusing screens 51 are replaced by a single diffusing screen halfway between the apertures 47 and 49, and the interior walls of the chamber are blackened instead of white. The softness of the edge which separates the exposed from the unexposed portions of the print would depend on the distance of the screen from the slits 47 and 49. In place of the single diffusing screen, a lens may be placed between the slits 47 and 49, the lenses 46 and 50 being approximately at conjugate focal points of this lens. This will give substantially the same effect as the diffusing screen, but will give greater light intensity and therefore more rapid printing.

What I claim as new and desire to secure by Letters Patent of the United States is:

1. Film printing apparatus comprising means for subjecting a record film and a print film simultaneously to a light beam, a smooth faced driving drum arranged to engage and drive each of said films at a substantially constant speed, said films being constructed with sprocket tooth perforations therein and means for regulating the speed of said drums such that the ratio of the number of tooth perforations of the two films passing the light beam in any given interval is independent of shrinkage of the films.

2. Film printing apparatus comprising means for supporting a record film and a print film in spaced relation, means for exposing the print film to a band of light controlled by the record film and having a width of the order of a half wave length of a four thousand cycle sound record, sprocket driving means for said films, and means arranged between the supporting means and the sprocket means for driving the respective films independent of sprocket tooth action and each at the same speed at which it is driven by the sprocket means.

3. Film printing apparatus comprising means for supporting a record film and a print film in spaced relation, a source of light, means for directing a beam from said source through the record film to the print film, said beam where it engages the print film having a width of the order of half a wave length of a four thousand cycle sound record, a drive sprocket engaging each of said films, a common driving motor therefor, independent drums arranged between said supporting means and said sprockets for driving the respective films independent of sprocket tooth action and at speeds corresponding to the speeds at which they are driven by the respective sprockets.

4. Apparatus for printing a sound record from a record film to a print film comprising a fixed film supporting member having opposed curved guide faces, and having narrow light transmitting openings in said guide faces, drums for drawing said films over the respective guide surfaces each at a substantially uniform speed and independent of any sprocket tooth action, a source of light, and means for directing a beam therefrom through the openings in said faces.

5. Apparatus for printing a sound record from a record film to a print film comprising a fixed film supporting member having opposed convex smooth guide faces, each face having a narrow light transmitting opening therein, a separate motor driven drum for drawing each film over one of said guide faces independent of sprocket tooth action, braking means engaging the films for producing a predetermined film tension at the guide faces, a light source, and means for directing a beam therefrom through said openings and said record film.

6. Film printing apparatus comprising means for supporting portions of a record film and a print film in spaced relation, means for subjecting said films at their supported portion to a narrow beam of light, a smooth faced drum arranged to engage and drive each of said films at a substantially uniform speed, said films having sprocket tooth perforations therein, sprocket tooth means for governing the movement of each of said films, and speed regulating means associated with each drum for causing the drum and the sprocket means engaging each film to move film lengths having an equal number of perforations in a given time independent of film shrinkage.

7. Film printing apparatus comprising a member having a narrow light opening therein and arranged to engage a print film having sprocket tooth openings therein, means for directing a beam of light through said opening on said film, means for moving a record film uniformly through said light beam, a driving sprocket engaging the print film, a motor connected therewith, a drum having a separate driving motor and arranged between the supporting member and the sprocket for drawing the film over the supporting member with a uniform movement independent of sprocket tooth action, and means governed by the length of film between the sprocket and the drum for controlling the speed of one of said motors.

In witness whereof, I have hereunto set my hand this 21st day of November, 1927.

EDWARD W. KELLOGG.